(12) United States Patent
Amirpour et al.

(10) Patent No.: US 12,003,763 B2
(45) Date of Patent: Jun. 4, 2024

(54) PER-TITLE ENCODING USING SPATIAL AND TEMPORAL RESOLUTION DOWNSCALING

(71) Applicant: BITMOVIN, INC., San Francisco, CA (US)

(72) Inventors: Hadi Amirpour, Klagenfurt am Wörthersee (AT); Christian Timmerer, Klagenfurt am Wörthersee (AT)

(73) Assignee: BITMOVIN, INC., San Francisco, CA (US)

( * ) Notice: Subject to any disclaimer, the term of this patent is extended or adjusted under 35 U.S.C. 154(b) by 0 days.

(21) Appl. No.: 17/853,549

(22) Filed: Jun. 29, 2022

(65) Prior Publication Data
US 2023/0007298 A1 Jan. 5, 2023

Related U.S. Application Data

(60) Provisional application No. 63/217,774, filed on Jul. 2, 2021.

(51) Int. Cl.
*H04N 19/59* (2014.01)
*H04N 19/132* (2014.01)
(Continued)

(52) U.S. Cl.
CPC ........... *H04N 19/59* (2014.11); *H04N 19/132* (2014.11); *H04N 19/31* (2014.11); *H04N 19/33* (2014.11); *H04N 19/61* (2014.11); *H04N 19/85* (2014.11)

(58) Field of Classification Search
CPC ...... H04N 19/59; H04N 19/132; H04N 19/31; H04N 19/33; H04N 19/61; H04N 19/85;
(Continued)

(56) References Cited

U.S. PATENT DOCUMENTS

| 2014/0160318 A1* | 6/2014 | Blanquart | A61B 1/063 348/234 |
| 2016/0157725 A1* | 6/2016 | Munoz | A61B 5/0082 600/407 |

(Continued)

FOREIGN PATENT DOCUMENTS

WO  WO-2012066501 A1 *  5/2012  ............. G01B 11/25

OTHER PUBLICATIONS

Gernot Zwantschko, "What is Per-Title Encoding? How to Efficiently Compress Video", Bitmovin, pp. 1-14, https://bitmovin.com/per-title-encoding/.

(Continued)

*Primary Examiner* — Tracy Y. Li
(74) *Attorney, Agent, or Firm* — Marton Ribera Schumann & Chang LLP; Chien-Ju Alice Chuang; Hector J. Ribera

(57) ABSTRACT

Techniques relating to per-title encoding using spatial and temporal resolution downscaling is disclosed. A method for per-title encoding includes receiving a video input comprised of video segments, spatially downscaling the video input, temporally downscaling the video input, encoding the video input to generate an encoded video, then temporally and spatially upscaling the encoded video. Spatially downscaling may include reducing a resolution of the video input, and temporally downscaling may include reducing a framerate of the video input. Objective metrics for the upscaled encoded video show improved quality over conventional methods.

20 Claims, 9 Drawing Sheets

(51) Int. Cl.
*H04N 19/31* (2014.01)
*H04N 19/33* (2014.01)
*H04N 19/61* (2014.01)
*H04N 19/85* (2014.01)

(58) Field of Classification Search
CPC .. H04N 19/146; H04N 19/154; H04N 19/172; H04N 19/587; H04N 21/234363; H04N 21/234381; H04N 21/23439; H04N 21/8456

See application file for complete search history.

(56) References Cited

U.S. PATENT DOCUMENTS

| | | | | |
|---|---|---|---|---|
| 2020/0041417 | A1* | 2/2020 | Bawendi | G01N 21/6486 |
| 2020/0209401 | A1* | 7/2020 | Motoyama | G06T 7/50 |
| 2020/0359940 | A1* | 11/2020 | Saito | A61B 5/7278 |

OTHER PUBLICATIONS

Li et al., "Toward a Practical Perceptual Video Quality Metric", Netflix Technology Blog, Jun. 5, 2016, pp. 1-23, https://netflixtechblog.com/toward-a-practical-perceptual-video-quality-metric-653f208b9652.

Apple, "HTTP Live Streaming (HLS) Authoring Specification for Apple Devices", pp. 1-133, https://developer.apple.com/documentation/http_live_streaming/hls_authoring_specification_for_apple_devices.

Jon Dahl, "Instant Per-Title Encoding", MUX, Apr. 17, 2018, pp. 1-8, https://mux.com/blog/instant-per-title-encoding/.

Pasandi et al., "CONVINCE: Collaborative Cross-Camera Video Analytics at the Edge", arXiv:2002.03797v1, Feb. 5, 2020, pp. 1-6.

Madhusudana et al., "Subjective and Objective Quality Assessment of High Frame Rate Videos", IEEE Access, vol. 9, Sep. 27, 2021,. pp. 1-15.

Katsenou et al., "Perceptually-Aligned Frame Rate Selection Using Spatio-Temporal Features", University of Bristol, 2018, pp. 1-6.

Joskowicz et al., "Combining the Effects of Frame Rate, Bit Rate, Display Size and Video Content in a Parametric Video Quality Model", Proceedings of the 6th Latin America Networking Conference, Oct. 2011, pp. 1-8.

Ge et al., "Towards QoE-assured 4K Video-on-Demand Delivery through Mobile Edge Virtualization with Adaptive Prefetching", IEE Transactions on Multimedia, pp. 1-16.

Nasiri et al., "Perceptual Quality Assessment of High Frame Rate Video", IEE International Workshop on Multimedia Signal Processing, Oct. 2015, pp. 1-6.

Huynh-Thu et al., "Impact of Jitter and Jerkness on Perceived Video Quality", Conference: 2nd International Workshop on Video Processing for Consumer Electronics, Jan. 2006, pp. 1-6.

* cited by examiner

Table 1: Bitrate saving (BD-rate (%)) against encoding with 1080p, 120fps.

| | Video characteristics | | | | BD-Rate (PSNR) | | BD-Rate (VMAF) | |
|---|---|---|---|---|---|---|---|---|
| | Source | SI | TI | framerate | state-of-the-art | PSTR | state-of-the-art | PSTR |
| Beauty | UVG | 16.89 | 7.21 | 120 | -26.38 | -28.15 | -32.05 | -48.06 |
| Bosphorus | UVG | 29.76 | 4.70 | 120 | -13.72 | -17.06 | -15.00 | -29.41 |
| Flowers | BVI-HFR | 56.01 | 3.11 | 120 | -11.85 | -37.54 | -9.72 | -24.16 |
| Golf | BVI-HFR | 51.25 | 3.08 | 120 | -17.01 | -42.17 | -8.92 | -33.11 |
| HoneyBee | UVG | 25.04 | 2.38 | 120 | -3.09 | -15.38 | -9.31 | -29.28 |
| Jockey | UVG | 25.71 | 20.95 | 120 | -34.36 | -34.71 | -37.74 | -37.74 |
| Pond | BVI-HFR | 70.03 | 1.65 | 120 | -12.60 | -45.90 | -6.34 | -38.80 |
| Typing | BVI-HFR | 29.28 | 3.75 | 120 | -19.87 | -35.35 | -17.16 | -22.25 |
| YachtRide | UVG | 47.83 | 12.02 | 120 | -11.25 | -11.74 | -14.56 | -35.84 |
| average | | | | | -16.68 | -29.82 | -16.75 | -33.18 |

FIGURE 6

PER-TITLE ENCODING USING SPATIAL AND TEMPORAL RESOLUTION DOWNSCALING

CROSS-REFERENCE TO RELATED APPLICATIONS

This application claims the benefit of U.S. Provisional Patent Application No. 63/217,774 entitled "Per-Title Encoding Using Spatial and Temporal Resolutions," filed Jul. 2, 2021, the contents of which are hereby incorporated by reference in their entirety.

BACKGROUND OF INVENTION

In response to the high demand for efficient video streaming services in heterogeneous environments, video segments in HTTP Adaptive Streaming (HAS) are provided as a set of bitrate-resolution pairs that is also referred to as bitrate ladder. Depending on the network conditions, the appropriate bitrate-resolution pair referred to as a representation is selected and delivered to the end-user. Traditional approaches mainly use a single bitrate ladder for all video contents, or they use a limited number of fixed bitrate ladders for different video genres. For example, a conventional approach classifies video content into three different categories including, animation, sport, and movie and encode each genre into a different fixed bitrate ladder. However, due to the huge diversity in video characteristics, this "one-size-fits-all" bitrate ladder needs further improvement.

Using a fixed bitrate ladder for all video content is far from optimal—a less complex video may suffer from over-allocating bitrate, leading to bandwidth waste, and conversely, under-allocating bitrate for high complex videos results in a lower Quality of Experience (QoE). An optimal bitrate ladder requires different bitrates for a certain perceived video quality.

In addition to the bitrate, the impact of spatial resolution on the perceived video quality is another consideration for better QoE. The usual trend is that lower resolutions outperform higher resolutions at lower bitrates, and as the bitrate increases, the resolution is switched to a higher resolution. The lower resolution version of each video content is affected by compression and upsampling artifacts, while the highest resolution version is only affected by compression artifacts. At lower bitrates, the lower resolution versions have better quality than the highest resolution version due to the smaller number of pixels, which results in a higher quality video than the highest resolution version encoded at the same bitrate, even when upsampling is applied. However, as the bitrate increases, higher resolution versions will outperform lower resolution versions in terms of quality. This has motivated researchers to optimize the bitrate ladder per video content and per-title encoding. Typically, for each video content, the bitrate ladder is optimized over (i) bitrate and (ii) resolution.

Per-title encoding can significantly reduce the storage and delivery costs of video streams and increase QoE based on the fact that in a given bitrate range, each resolution performs better than others in a specific region and these regions are dependent on the video content. To compare the quality of different resolutions, all resolutions are upscaled to that of the original video and scaled objective metrics are calculated. Therefore, each video segment is encoded at a number of quality levels and bitrate-resolution pairs per each quality level. The resolution and bitrate are limited to a finite set. The encodings are selected based on the following criteria: (i) the selected bitrate-resolution pair should be of the highest possible quality; (ii) there should be a perceptual gap between adjacent selected bitrates.

In another conventional approach, the encodings are selected between two quality levels: (i) upper quality, where there is no visible quality improvement beyond that; (ii) lower quality, where encoding artifacts become visible lower than that. N encodings are selected between these two quality levels to form the bitrate ladder. An example of selecting four encodings for their per-title bitrate ladder is shown in FIG. 2. In this example, the upper quality PSNR has been set to 45 dB, and the lower quality PSNR has been set to 35 dB, and N is equal to 4. MiPSO utilizes a multi-period per-scene optimization procedure that optimizes the bitrate ladder for (i) maximum possible quality or (ii) minimum possible bitrate.

Considering r resolutions, and b bitrates, finding the per-title bitrate ladder requires r×b encodings to be encoded. To avoid a brute force encoding of all bitrate-resolution pairs, some methods pre-analyze the video contents. A content-gnostic method that utilizes machine learning to find the bitrate range for each resolution that outperforms the other resolutions also has been introduced. This approach requires 94.2% fewer pre-encodes compared to the brute force approach while reaching a 0.51 BD-Rate loss.

Current per-title encoding schemes encode the same video content (or snippets/subsets thereof) at various bitrates and spatial resolutions to find the optimal bitrate ladder for each video file. Based on the bitrate-quality relationship, a convex-hull is formed for each content and the optimal bitrate ladder is defined. Compared to traditional approaches, in which a predefined, content-agnostic ("fit-to-all") encoding ladder was applied to all video contents, per-title encoding can result in a significant decrease in the storage and delivery costs of video streams and increase the quality of service (QoS). In current per-title encoding schemes, the bitrate ladder is optimized using only spatial resolution, while we argue that with the emergence of high frame rate videos, this principle can be extended to the temporal resolution.

The usual trend is that lower resolutions outperform higher resolutions at lower bitrates, and as the bitrate increases, the resolution is switched to a higher resolution. The lower resolution version of each video content is affected by compression and upsampling artifacts, while the highest resolution version is only affected by compression artifacts. At lower bitrates, the lower resolution versions have better quality than the highest resolution version due to the smaller number of pixels, which results in a higher quality video than the highest resolution version encoded at the same bitrate, even when upsampling is applied. However, as the bitrate increases, higher resolution versions will outperform lower resolution versions in terms of quality. As an example, two videos, namely Golf and Jockey from UVG and BVI-HFR datasets were encoded at two resolutions (i.e., 1080p and 540p), and their encoding efficiency is illustrated in FIG. 1A. For Golf, there is a change over at approx. 1400 kbps between RD curves at 540p and 1080p resolutions. At lower bitrates than this intersection, 540p outperforms 1080p resolution, while 1080p will be superior at higher bitrates. On the other hand, for Jockey, 540p is superior at the given bitrate. This content-based behavior motivated researchers to optimize the bitrate ladder per video content and per-title encoding was introduced. In general, for each video content, the bitrate ladder is optimized over (i) bitrate and (ii) resolution.

Per-title encoding can significantly reduce the storage and delivery costs of video streams and increase QoE. It is based on the fact that in a given bitrate range, each resolution performs better than others in a specific region and these regions are dependent on the video content. To compare the quality of different resolutions, all resolutions are upscaled to that of the original video and scaled objective metrics are calculated. Therefore, each video segment is encoded at a number of quality levels and bitrate-resolution pairs per each quality level. The resolution and bitrate are limited to a finite set. The encodings are selected based on the following criteria: (i) the selected bitrate-resolution pair should be of the highest possible quality; (ii) there should be a perceptual gap between adjacent selected bitrates.

In another approach, the encodings are selected between two quality levels: (i) upper quality, where there is no visible quality improvement beyond that; (ii) lower quality, where encoding artifacts become visible lower than that. N encodings are selected between these two quality levels to form the bitrate ladder. An example of selecting four encodings for a per-title bitrate ladder is shown in FIG. 2. In this example, the upper quality PSNR has been set to 45 dB, and the lower quality PSNR has been set to 35 dB, and N is equal to 4. MiPSO utilizes a multi-period per-scene optimization procedure that optimizes the bitrate ladder for (i) maximum possible quality or (ii) minimum possible bitrate. Considering r resolutions, and b bitrates, finding the per-title bitrate ladder requires r×b encodings to be encoded.

To avoid a brute force encoding of all bitrate-resolution pairs, some methods pre-analyze the video contents. A content-gnostic method that utilizes machine learning may be employed to find the bitrate range for each resolution that outperforms the other resolutions. This approach requires approximately 94% fewer pre-encodes compared to the brute force approach while reaching approximately a 0.51 BD-Rate loss.

All of the methods mentioned above consider the optimization of the bitrate ladder over (i) the bitrate and/or (ii) the spatial resolution only, without consideration of temporal resolution. With the increasing interest in high spatial resolution videos, as well as high temporal resolution videos, known as High FrameRate (HFR) videos, a solution for per-title encoding using spatial and temporal resolutions is desirable.

BRIEF SUMMARY

A system and method are disclosed for per-title encoding using spatial and temporal resolution downscaling. A method for per-title encoding may include: receiving a video input comprising a plurality of video segments; spatially downscaling the video input to generate a first downscaled representation of the video input; temporally downscaling the first downscaled representation of the video input to generate a second downscaled representation of the video input; encoding the second downscaled representation of the video input to generate an encoded video; temporally upscaling the encoded video to generate a first upscaled encoded video; and spatially upscaling the first upscaled encoded video to generate a second upscaled encoded video. In some examples, the spatially downscaling the video input comprises reducing the resolution of the video input such that the first downscaled representation of the video input has a lower resolution than the video input. In some examples, reducing the resolution of the video input comprises reducing the resolution of each of the plurality of video segments. In some examples, the temporally downscaling the first downscaled representation of the video input comprises reducing the number of frames in the first downscaled representation such that the second downscaled representation has fewer frames than the video input. In some examples, reducing the number of frames in the first downscaled representation of the video input comprises reducing the number of frames of each of the plurality of video segments. In some examples, the temporally upscaling the encoded video comprises duplicating frames. In some examples, the temporally upscaling the encoded video comprises frame averaging. In some examples, the temporally upscaling the encoded video comprises video interpolation. In some examples, the temporally upscaling the encoded video comprises bicubic interpolation. In some examples, the first upscaled encoded video has the same number of frames as the video input. In some examples, the second upscaled encoded video has the same resolution as the video input.

In some examples, the method also includes calculating an objective metric using the second upscaled encoded video. In some examples, the objective metric comprises a peak signal-to-noise ratio (PSNR). In some examples, the objective metric comprises a video multimethod assessment fusion (VMAF). In some examples, the encoding is performed according to an H.26x standard. In some examples, the encoded video comprises an uncompressed encoding.

A system for per-title encoding may include: a memory comprising non-transitory computer-readable storage medium configured to store a plurality of video segments and data associated with the plurality of video segments; one or more processors configured to execute instructions stored on the memory to: receive a video input comprising the plurality of video segments, spatially downscale the video input to generate a first downscaled representation of the video input, temporally downscale the first downscaled representation of the video input to generate a second downscaled representation of the video input, encode the second downscaled representation of the video input to generate an encoded video, temporally upscale the encoded video to generate a first upscaled encoded video, and spatially upscale the first upscaled encoded video to generate a second upscaled encoded video. In some examples, the data associated with the plurality of video segments comprises a spatial resolution. In some examples, the data associated with the plurality of video segments comprises a temporal resolution including a framerate. In some examples, the data associated with the plurality of video segments comprises an objective metric.

BRIEF DESCRIPTION OF THE DRAWINGS

Various non-limiting and non-exhaustive aspects and features of the present disclosure are described hereinbelow with references to the drawings, wherein:

FIG. 6 is a table indicating exemplary bitrate savings against encoding using spatial and temporal resolution downscaling, in accordance with one or more embodiments.

Like reference numbers and designations in the various drawings indicate like elements. Skilled artisans will appreciate that elements in the Figures are illustrated for simplicity and clarity, and have not necessarily been drawn to scale, for example, with the dimensions of some of the elements in the figures exaggerated relative to other elements to help to improve understanding of various embodiments. Common, well-understood elements that are useful or necessary in a commercially feasible embodiment are often not depicted in order to facilitate a less obstructed view of these various embodiments.

DETAILED DESCRIPTION

The invention is directed to per-title encoding using spatial and temporal resolutions. This invention employs sophisticated techniques in order to find the optimal bitrate ladder for each video file using both spatial and temporal resolutions. Per-title encoding using Spatio-Temporal Resolutions (PSTR) optimizes the bitrate ladder over both spatial and temporal resolutions. In this invention, based on a given input (e.g., original) video sequence with high temporal (e.g., 60-120 fps and higher) and spatial (e.g., 720p-1080p and higher) resolutions, each sequence or segment of the input video sequence may be downscaled spatially and temporally to lower spatial resolutions and frame rates to find optimal spatial and temporal resolutions for each bitrate.

Figure 4:
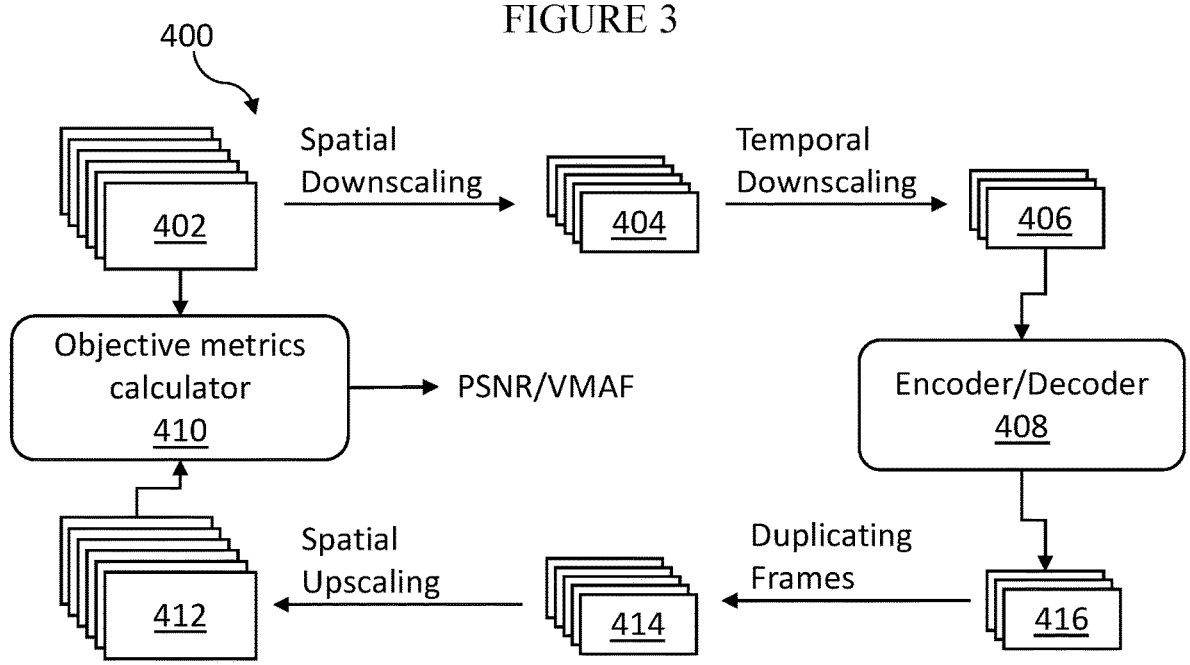
FIG. 4 is a flow diagram illustrating an exemplary flow of a video input being processed through a method for per-title encoding using spatial and temporal resolution downscaling, in accordance with one or more embodiments.
Figure 5A:
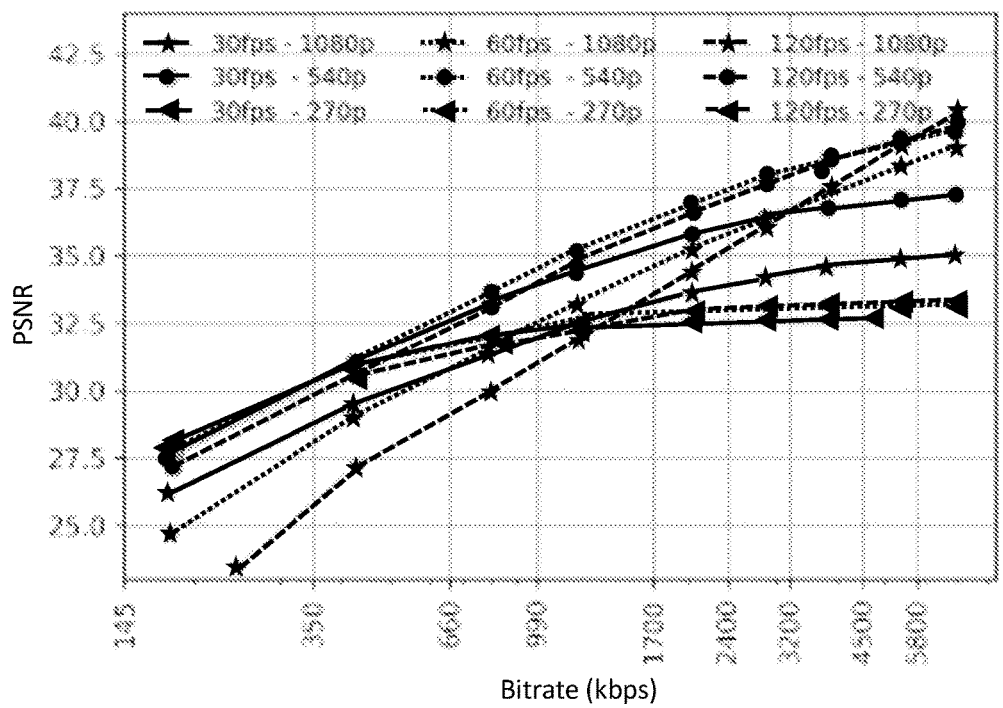
FIGS. 5A-5D is a series of charts showing exemplary RD curves and convex hulls for an exemplary video sequence according to PSNR and VMAF, in accordance with one or more embodiments.
Figure 5B:
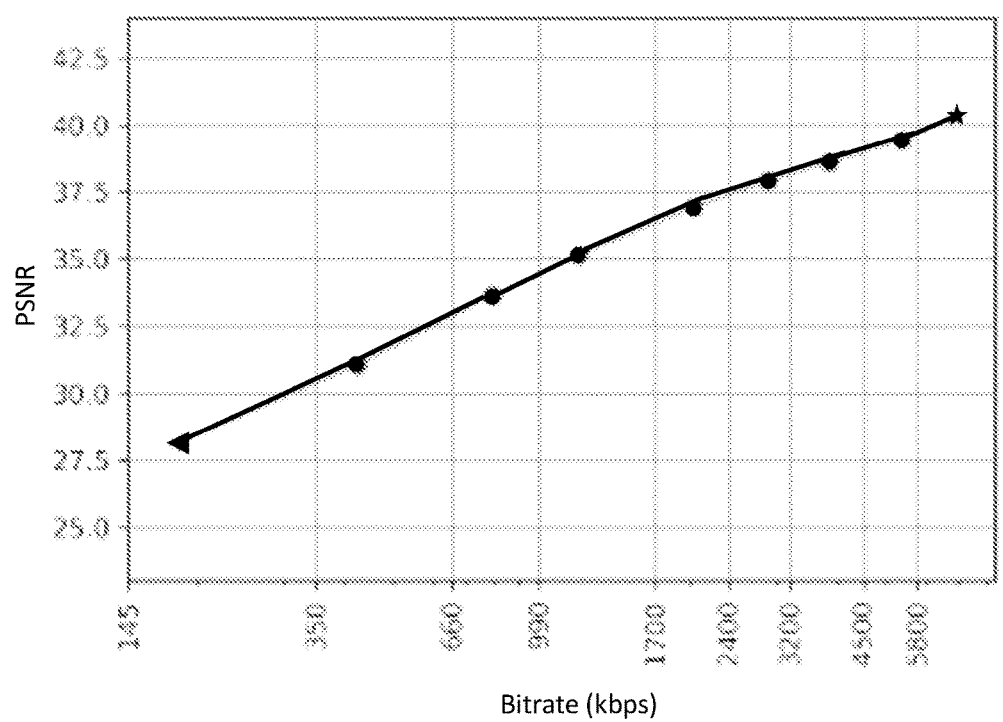
Figure 5C:
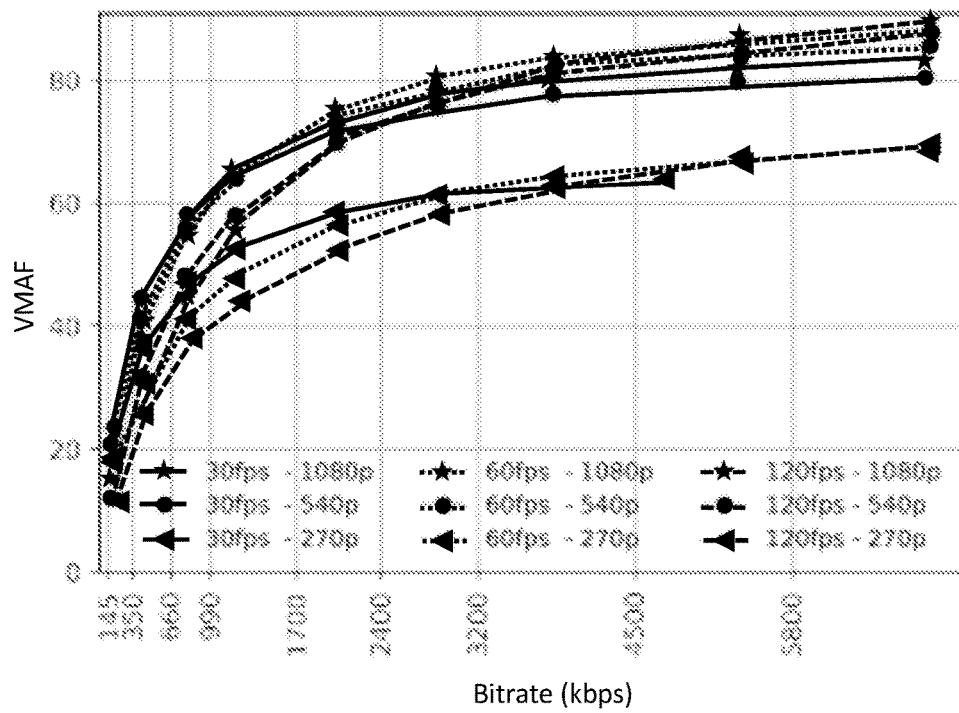
Figure 5D:
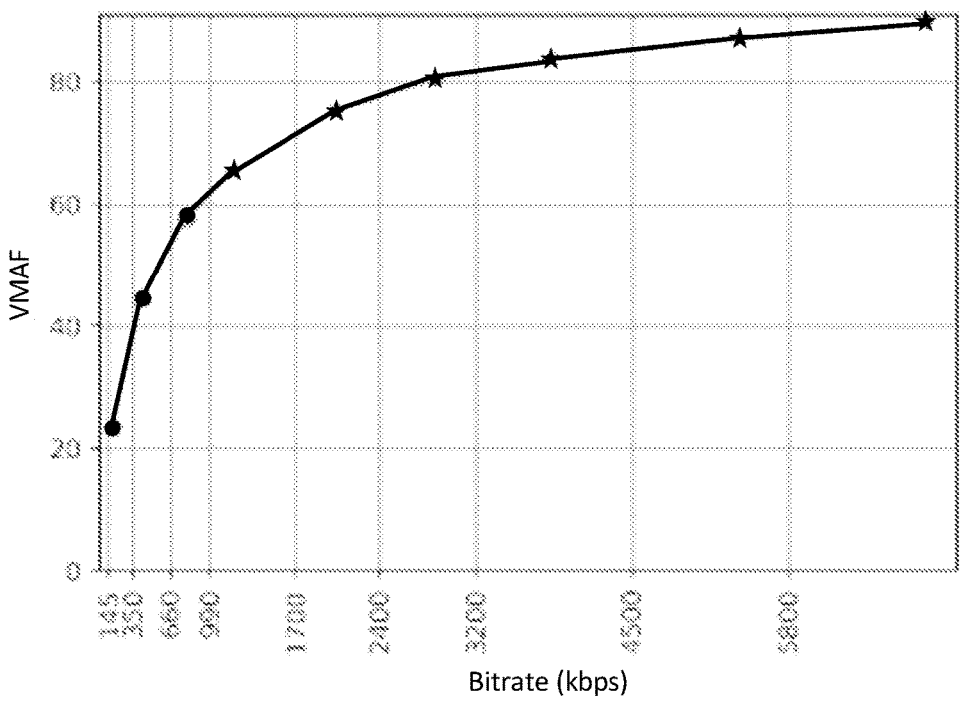

As shown in FIG. 4, and described below, to find the optimal spatial and temporal resolutions for each bitrate, each video segment may be spatially and temporally downscaled. An optimal spatial and temporal resolutions for each bitrate may be selected from two or more spatial resolutions (e.g., 1080p, 720p, 540p, etc.) and two or more framerates (e.g., 120 fps, 60 fps, 30 fps, etc.).

Per-title encoding using PSTR optimizes the bitrate ladder over both spatial and temporal resolutions. This approach significantly improves the performance of bitrate savings by considering the temporal resolution in addition to the spatial resolution. In some examples, using lower spatial resolution and frame rates at lower bitrates and higher spatial resolution and frame rates at higher bitrates yields improved quality. Using methods described herein, improvements to the impact of temporal resolution on video compression and perceived video quality are shown in HFR videos.

Under a low bitrate constraint, a lower spatial resolution is often beneficial over a lower framerate. Furthermore, a low framerate may be beneficial for video sequences with high temporal activity, and a high framerate may be beneficial for video sequences with low temporal activity. In some examples, a parametric model may be used to predict the perceived video quality considering: (i) bitrates, (ii) framerate, (iii) display sizes, and (iv) video content. In some examples, a subjective test may be conducted on compressed videos at different (i) quantization levels, (ii) framerates, and (iii) spatial resolutions. Temporal resolution has a high impact on video compression and the perceived video quality. Therefore, the methods described herein optimize the bitrate ladder over both spatial and temporal resolutions.

Figure 1A:
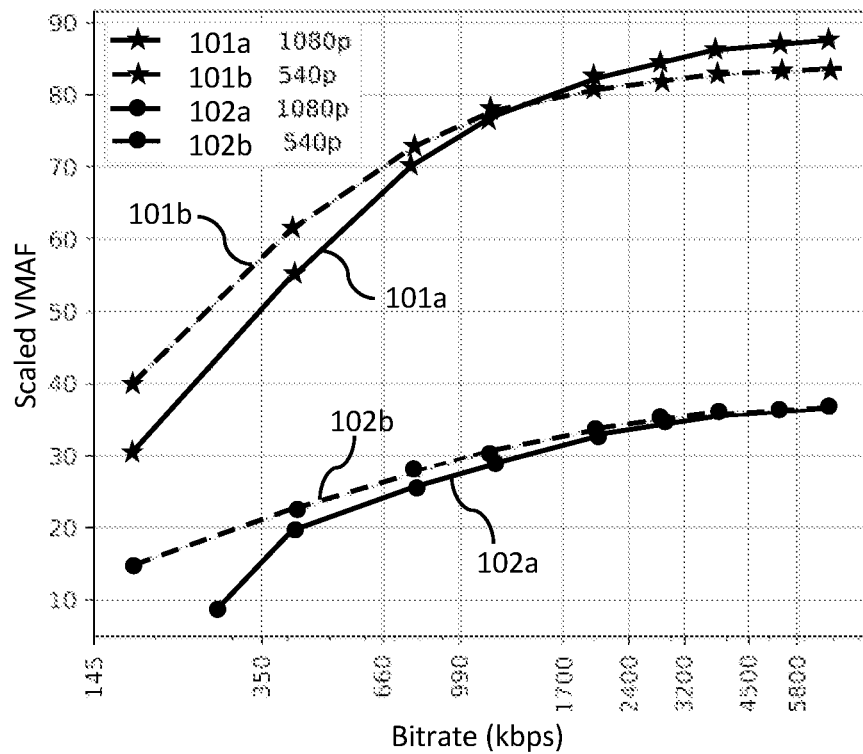
FIG. 1A is a chart showing perceived video quality to framerates using prior art methods.

At higher bitrates, usually, there are enough bits to allocate to all frames and their pixels. At lower bitrates, however, the lack of an adequate bitrate budget results in inferior video quality. To overcome this problem, video frames are usually downscaled to get enough bitrate budget. However, an upscaling artifact is added when the compressed video at a lower resolution is restored to its original resolution. Therefore, there is often a trade-off between the perceived video quality of the compressed video in its original resolution and an upscaled version of the video when it is compressed at a lower resolution. FIG. 1A is a chart showing perceived video quality to framerates using prior art methods. As shown in FIG. 1A, without consideration of temporal resolution, encoding at higher spatial resolutions typically results in higher quality at all bitrates. This trade-off depends on the content and may be improved by per-title encoding. It may be further improved by consideration of temporal resolutions, as described herein.

To avoid high compression artifacts on a video compressed in high resolution and framerate, videos can also be downsampled in time (e.g., by framerate reduction). With frame dropping, bitrate budget may be allocated to remaining frames for quality improvement. However, a temporal artifact is often added when the video is temporally upscaled back to its native framerate. Again, a trade-off is made between the perceived video quality of the compressed video at its original framerate and the video compressed at a lower framerate that is temporally upscaled. Typically, higher framerates are advantageous at higher bitrates, in particular in simple sequences with camera motions. However, at lower bitrates, a lower framerate video may perform better than higher framerate video in terms of encoding efficiency.

Figure 1B:
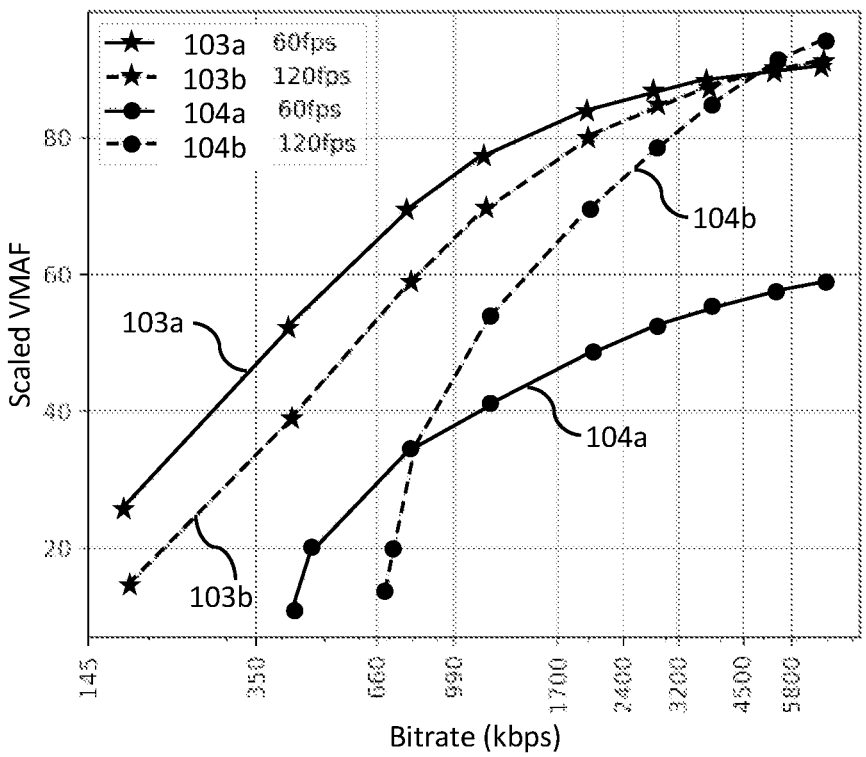
FIG. 1B is a chart showing perceived video quality when per-title encoding using spatial and temporal resolution downscaling, in accordance with one or more embodiments.
Figure 2:
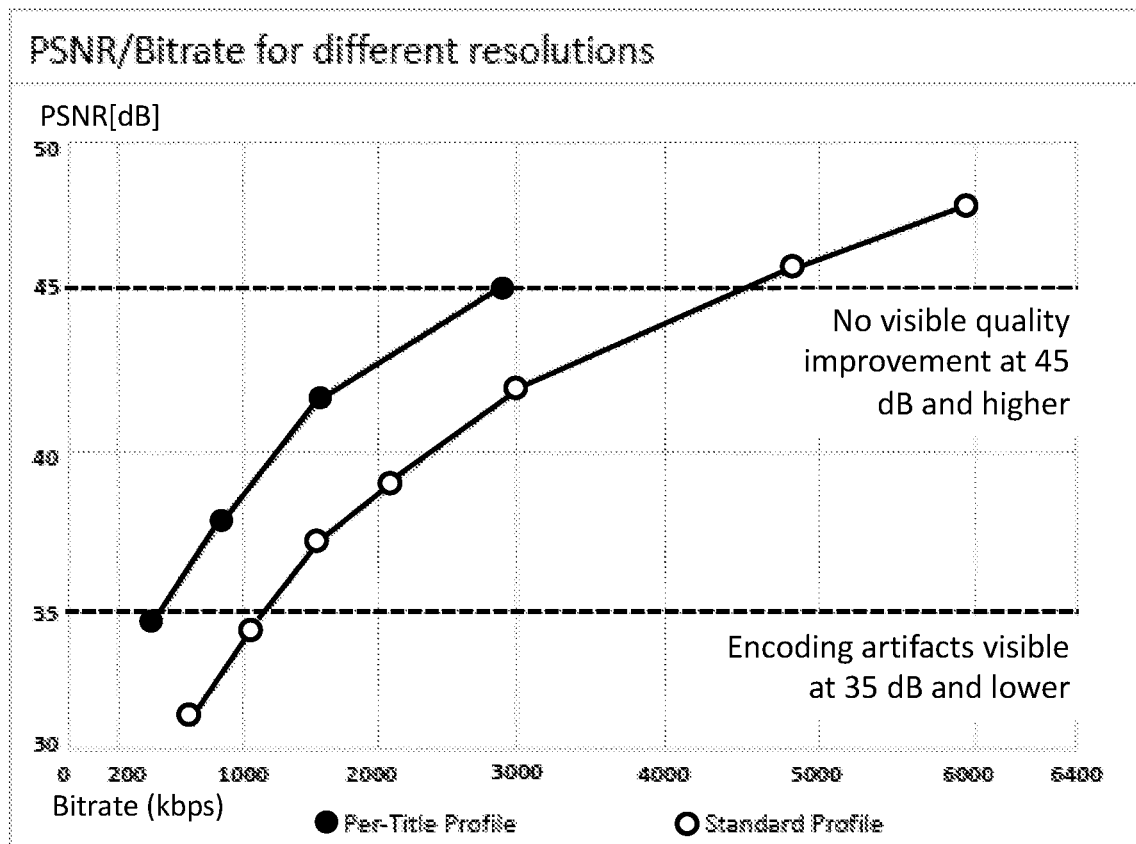
FIG. 2 is a chart showing a prior art method of selecting encodings between two quality levels.

FIG. 1B is a chart showing perceived video quality when per-title encoding using spatial and temporal resolution downscaling, in accordance with one or more embodiments. Perceived video quality may be represented using peak signal-to-noise ratio (PSNR), video multimethod assessment fusion (VMAF), and other objective metrics. The chart shows two exemplary videos were encoded at their original spatial resolution (e.g., 1080p or other high spatial resolution) and at two different framerates (e.g., line 103a showing scaled VMAF for a first video encoded at 60 fps, line 103b showing scaled VMAF of the first video encoded at 120 fps, line 104a showing scaled VMAF for a second video encoded at 60 fps, and line 104b showing scaled VMAF for the second video encoded at 120 fps). Similar to spatial resolution, the quality of each framerate outperforms the other in a specific region. For example, at lower bitrates, lower framerates (e.g., lines 103a and 104a) perform better, whereas at higher bitrates, higher framerates (e.g., lines 103b and 104b). Likewise to spatial resolution, each framerate's superior region depends on the video content. As shown in FIG. 1B, for the first video, the cross-over between lines 103a and 103b happens at a higher bitrate at a higher bitrate (approximately 5300 kbps), whereas for the second video, the cross-over between lines 104a and 104b happens at a lower bitrate (approximately 810 kbps).

Figure 3:
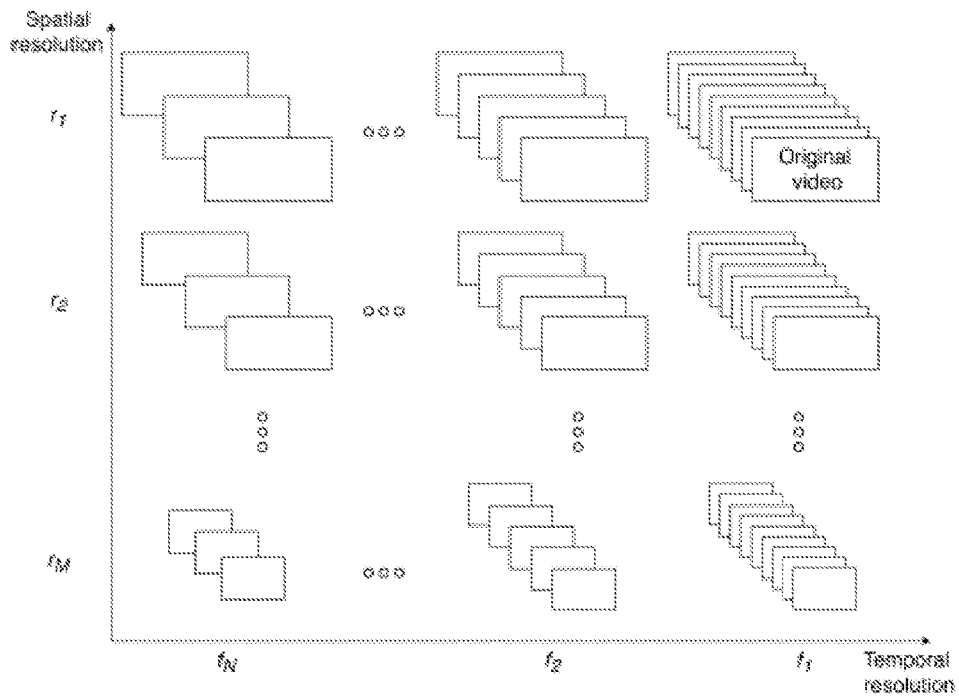
FIG. 3 is a chart showing relative spatial and temporal resolutions for exemplary generated encodings, in accordance with one or more embodiments.

Considering the impact of framerate, in PSTR, the perceived video quality or QoE is considered as a function of three parameters: (i) bitrate (b), (ii) spatial resolution (r), and (iii) framerate (f):

$$QoE = F(b, r, f)$$

while in conventional methods QoE is defined as a function of b and r, i.e., QoE=F(b, r). Therefore, we optimize the bitrate ladder over these parameters, i.e., b, r, and f. To design the PSTR bitrate ladder and form the convex hull, the following parameters are determined for each video content:
  b: a set of bitrates or quality levels.
  r: a set of spatial resolutions.
  f: a set of framerates.
and the original video is temporally and spatially downscaled to generate r×f uncompressed encodings. Because of practical constraints, these sets are limited to finite sets. FIG. 3 shows an example of generated encodings, wherein the original video is temporally and spatially downscaled to generate N×M uncompressed encodings—the original video being temporally downscaled from framerates $f_1$ to $f_N$ and spatially downscaled from resolutions $r_1$ to $r_M$. All of them are encoded at b bitrates or quality levels resulting in a total of r×f×b encodings. From these encodings, bitrate-resolution-framerate triples that are closer to the convex hull are selected to form the per-title bitrate ladder.

Note that optimization over f framerates will require a compression of r×f×b encodings, i.e., f times more encodings than conventional methods (i.e., r×b), resulting in additional computations. However, the optimal bitrate-resolution-framerate triple can be estimated using prediction methods (e.g., machine learning) to avoid a brute force process. To reduce the framerate, frame dropping or frame averaging may be used. Frame dropping is a computationally inexpensive task.

To evaluate the quality of the encodings, for encodings where the resolution or framerate does not match that of the original video, encoded video may be spatially and/or temporally upscaled. An example of an objective metric calculation when implementing method for per-title encoding using spatial and temporal resolutions, as disclosed herein, is shown in FIG. 4. In diagram 400, the original video input 402 (e.g., 1080p, 60 fps) comprising a plurality of video segments may be spatially downscaled to video representation 404 (e.g., 540p, 60 fps) with a lower spatial resolution than video input 402. Video representation 404 may be temporally downscaled to video representation 406 (e.g., 540p, 30 fps) with a lower temporal resolution (e.g., fewer frames), and video representation 406 may be encoded at encoder/decoder 408 (e.g., using H.26x standards, such as H.261, H.262, H.263, Advanced Video Coding (AVC), High Efficiency Video Coding (HEVC), and the like). Thereafter, encoded video 416 may be inversely upscaled temporally (e.g., by duplicating frames, frame averaging, video interpolation, and the like) to generate video representation 414 (e.g., 540p, 30 fps) and spatially upscaled to generate output video 412, which matches the resolution and framerate of the original video. Objective metrics of both original video 402 and output video 412 may be calculated by objective metrics calculator 410, such objective metrics may include peak signal-to-noise ratio (PSNR) and video multimethod assessment fusion (VMAF), among others. To avoid the costly impact of sophisticated spatial and temporal resolution upscaling methods a bicubic interpolation and frame duplicating method, along with other methods such as averaging or video interpolation methods, may be used.

Example Data

In an example, nine HFR videos with 1080p and 120 fps from two datasets, i.e., BVI-HFR and UVG. Spatial Information (SI), and Temporal Information (TI) of these test videos are shown in Table 1 in FIG. 6. From each video, its first four seconds have been selected. These video segments are spatially and temporally downscaled to generate nine uncompressed encodings per each video. In other examples, video segments may be downscaled to generate more or less than nine encodings per video.

Many objective metrics have been introduced to mimic human vision. Some of them take framerate into consideration. Benchmarking objective metrics indicate that peak signal-to-noise ratio (PSNR) and video multimethod assessment fusion (VMAF) are among the top highly correlated objective metrics.

In an example, a set of three parameters may be used to optimize the bitrate ladder in PSTR, i.e., bitrate, resolution, and framerate. Three spatial resolutions (r=3), namely 1080p, 540p, and 270p and three framerates (f=3), namely 120 fps, 60 fps, and 30 fps resulting in 9 uncompressed encodings. In other examples, more or less spatial resolutions and framerates may be used to result in more or less encodings (e.g., r=2 or 4 or more, f=2 or 4 or more). For bitrate, a fixed set of bitrates (e.g., 45, 350, 550, 990, 1700, 2400, 3200, 4500, and 5800 kbps) adopted from HLS bitrate ladder for HEVC may be used. Each of the nine generated uncompressed encodings that differ from the others in resolution and/or framerate may be encoded at the nine different bitrates resulting in a total of 3×3×9=81 compressed encodings per video sequence. The bitrate-resolution-framerate triples that are as close as possible to the convex hull are selected for each bitrate. FIGS. 5A-5D is a series of charts showing exemplary RD curves and convex hulls for an exemplary video sequence according to PSNR and VMAF, in accordance with one or more embodiments. The selected bitrate-resolution-framerate triples confirm the impact of both spatial and temporal resolutions on the bitrate ladder optimization. As described herein bitrate-resolution-framerate triples are dependent on the video content. In FIG. 6, a comparison is made between BD-Rates calculated according to: (i) conventional (i.e., "state-of-the-art") methods wherein we optimize the bitrate ladder only over the spatial resolution—to form a convex hull, we select the bitrate-resolution-framerate triples using a framerate of 120 fps, and (ii) PSTR, wherein we optimize the bitrate ladder over both spatial and temporal resolutions, as described herein (e.g., FIGS. 4 and 7A-7B). Table 1 in FIG. 6 summarizes bitrate savings (BD-Rate) against encoding at 1080p and 120 fps for a variety of example videos with varying video content. PSTR doubles the bitrate saving on average compared to conventional methods using both PSNR or VMAF as objective metrics. These results demonstrate that the temporal resolution can have a similar impact on the per-title encoding as the spatial resolution has. For some sequences, PSTR is significantly better than the conventional method, which shows the dependency of improvement on the video content. As shown in Table 1, for sequences with lower TI, the bitrate saving of PSTR over the state-of-the-art method is higher.

Example Methods

Figure 7A:
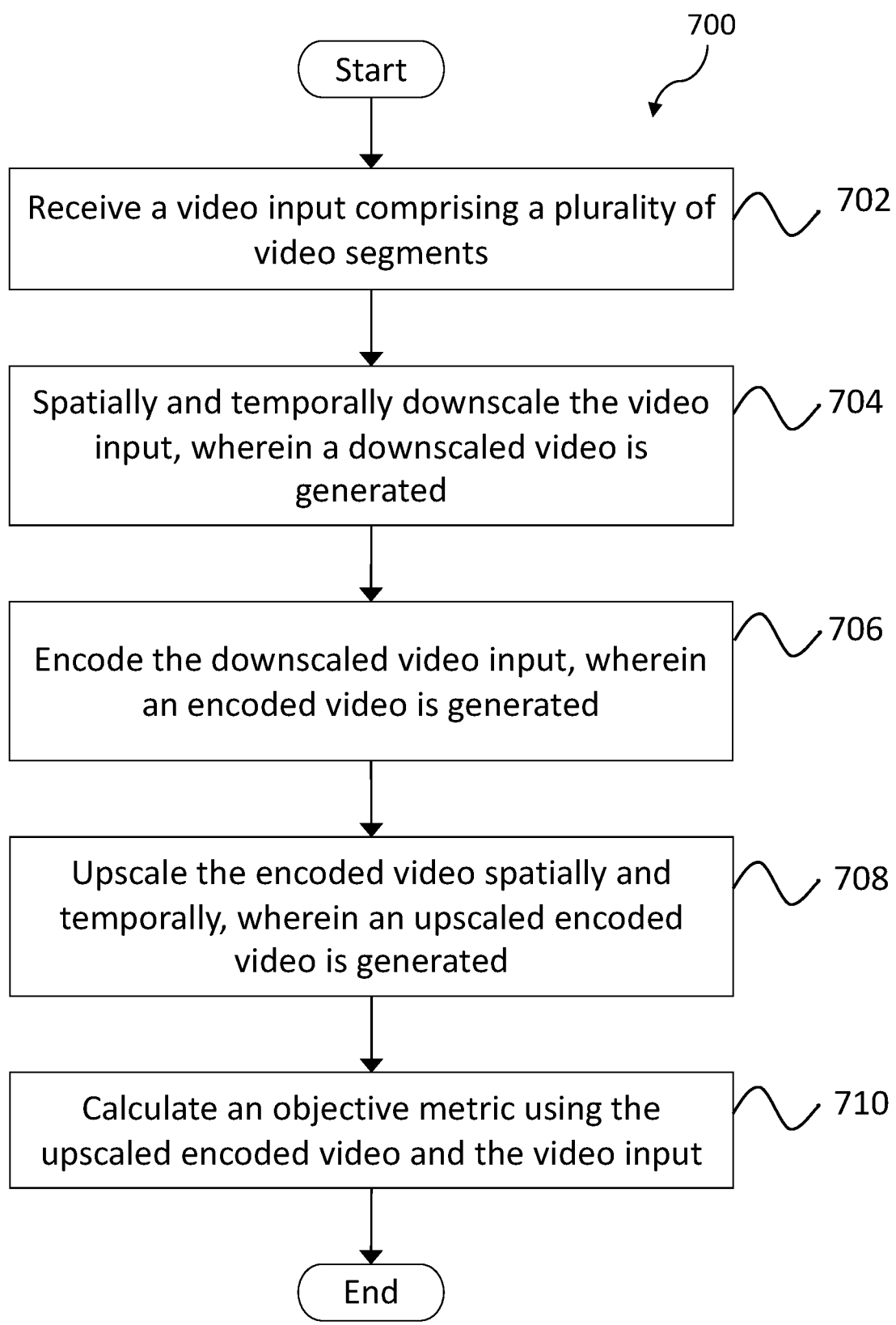
FIGS. 7A-7B are flow diagrams illustrating exemplary methods for per-title encoding using spatial and temporal resolutions, in accordance with one or more embodiments.
Figure 7B:
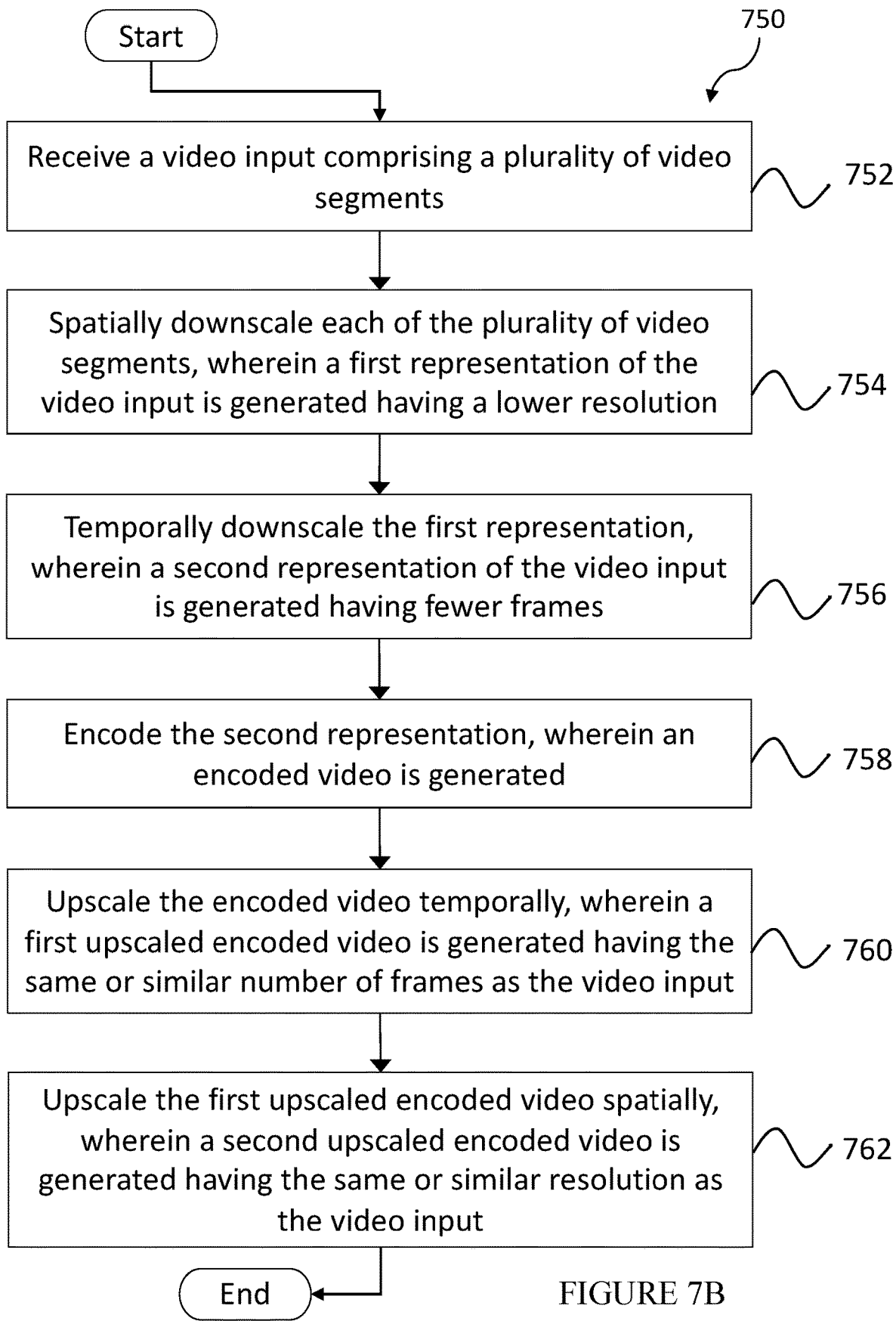
Figure 8A:
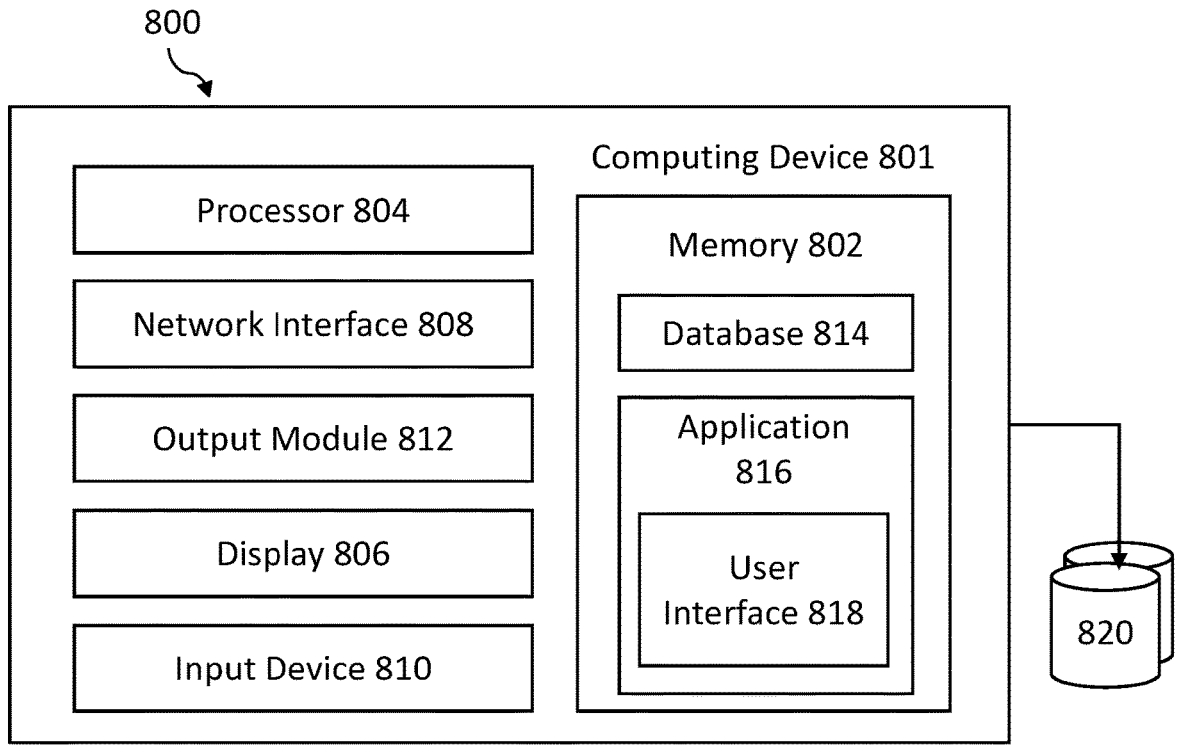
FIG. 8A is a simplified block diagram of an exemplary computing system configured to perform steps of the method illustrated in FIGS. 4 and 7A-7B, in accordance with one or more embodiments.
Figure 8B:
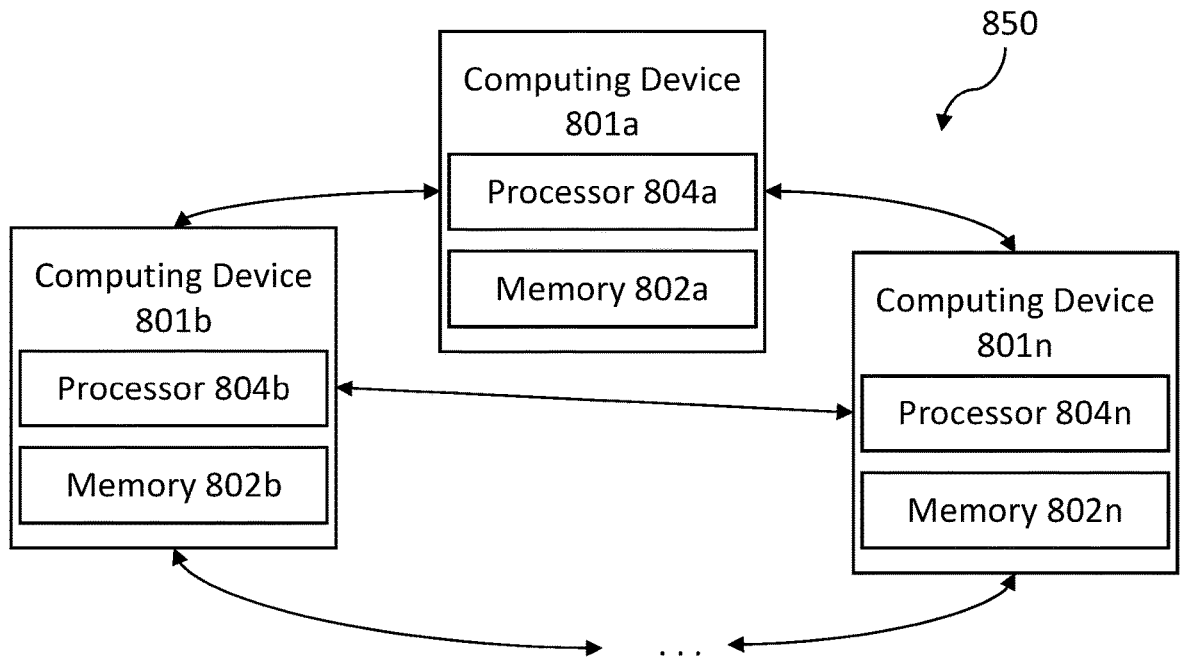
FIG. 8B is a simplified block diagram of an exemplary distributed computing system implemented by a plurality of the computing devices, in accordance with one or more embodiments.

FIGS. 7A-7B are flow diagrams illustrating exemplary methods for per-title encoding using spatial and temporal resolutions, in accordance with one or more embodiments. In FIG. 7A, method 700 begins with receiving, by a computing device (e.g., as shown in FIGS. 8A-8B), a video input comprising a plurality of video segments at step 702. The video input may be spatially and temporally downscaled at step 704 as described herein, wherein a downscaled video is generated. The downscaled video input may be encoded at step 706 as described herein, wherein an encoded video is generated. In some examples, each video segment in the plurality of video segments may be encoded at a number of quality levels and bitrate-resolution pairs per each quality level. The encoded video may be upscaled spatially and temporally at step 708 as described herein, wherein an upscaled encoded video is generated. For example, all resolutions may be upscaled to that of the original video input. Said upscaling may include one, or a combination, of bicubic interpolation, frame duplication, frame averaging, video interpolation, and the like. An objective metric may be calculated at step 710 using the upscaled encoded video and the video input. The objective metric may include PSNR and/or VMAF.

In FIG. 7B, method 750 may begin with receiving a video input comprising a plurality of video segments at step 752. Each of the plurality of video segments may be spatially downscaled at step 754, wherein a first representation of the video input is generated having a lower resolution than the original video input. The first representation may then be temporally downscaled at step 756, wherein a second representation of the video input is generated having fewer frames than the original video input. The second representation may be encoded at step 758, wherein an encoded video is generated. The encoded video may be upscaled temporally (e.g., by duplicating frames, frame averaging, video interpolation, and other methods as described herein) at step 760, wherein a first upscaled encoded video is generated having the same or similar number of frames as the video input. The first upscaled encoded video further may be upscaled spatially at step 762, wherein a second upscaled encoded video is generated having the same or similar resolution as the video input. As described herein, objective metrics may be calculated on the second upscaled encoded video, for example, to show improved Quality of Experience (QoE) over conventional methods for per-title encoding.

FIG. 8A is a simplified block diagram of an exemplary computing system configured to perform steps of the method illustrated in FIGS. 4 and 7A-7B, in accordance with one or more embodiments. In one embodiment, computing system 800 may include computing device 801 and storage system 820. Storage system 820 may comprise a plurality of repositories and/or other forms of data storage, and it also may be in communication with computing device 801. In another embodiment, storage system 820, which may comprise a plurality of repositories, may be housed in one or more of computing device 801. In some examples, storage system 820 may store video data, bitrate ladders, instructions, programs, and other various types of information as described herein. This information may be retrieved or otherwise accessed by one or more computing devices, such as computing device 801, in order to perform some or all of the features described herein. Storage system 820 may comprise any type of computer storage, such as a hard-drive, memory card, ROM, RAM, DVD, CD-ROM, write-capable, and read-only memories. In addition, storage system 820 may include a distributed storage system where data is stored on a plurality of different storage devices, which may be physically located at the same or different geographic locations (e.g., in a distributed computing system such as system 850 in FIG. 8B). Storage system 820 may be networked to computing device 801 directly using wired connections and/or wireless connections. Such network may include various configurations and protocols, including short range communication protocols such as Bluetooth™, Bluetooth™ LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

Computing device 801 also may include a memory 802. Memory 802 may comprise a storage system configured to store a database 814 and an application 816. Application 816 may include instructions which, when executed by a processor 804, cause computing device 801 to perform various steps and/or functions, as described herein. Application 816 further includes instructions for generating a user interface 818 (e.g., graphical user interface (GUI)). Database 814 may store various algorithms and/or data, including neural networks (e.g., video encoding, identifying high performing bitrate ranges and resolutions, framerate prediction, etc.) and data regarding bitrates, framerates, objective metrics, among other types of data. Memory 802 may include any non-transitory computer-readable storage medium for storing data and/or software that is executable by processor 804, and/or any other medium which may be used to store information that may be accessed by processor 804 to control the operation of computing device 801.

Computing device 801 may further include a display 806, a network interface 808, an input device 810, and/or an output module 812. Display 806 may be any display device by means of which computing device 801 may output and/or display data. Network interface 808 may be configured to connect to a network using any of the wired and wireless short range communication protocols described above, as well as a cellular data network, a satellite network, free space optical network and/or the Internet. Input device 810 may be a mouse, keyboard, touch screen, voice interface, and/or any or other hand-held controller or device or interface by means of which a user may interact with computing device 801. Output module 812 may be a bus, port, and/or other interface by means of which computing device 801 may connect to and/or output data to other devices and/or peripherals.

In one embodiment, computing device 801 is a data center or other control facility (e.g., configured to run a distributed computing system as described herein), and may communicate with a media playback device. As described herein, system 800, and particularly computing device 801, may be used for encoding, downscaling, upscaling video, optimizing a bitrate ladder, calculating objective metrics, and otherwise implementing steps in a per-title encoding method using spatio-temporal resolutions, as described herein. Various configurations of system 800 are envisioned, and various steps and/or functions of the processes described herein may be shared among the various devices of system 800 or may be assigned to specific devices.

FIG. 8B is a simplified block diagram of an exemplary distributed computing system implemented by a plurality of the computing devices, in accordance with one or more embodiments. System 850 may comprise two or more computing devices 801a-n. In some examples, each of 801a-n may comprise one or more of processors 804a-n, respectively, and one or more of memory 802*a-n*, respectively. Processors 804*a-n* may function similarly to processor 804 in FIG. 8A, as described above. Memory 802*a-n* may function similarly to memory 802 in FIG. 8A, as described above.

While specific examples have been provided above, it is understood that the present invention can be applied with a wide variety of inputs, thresholds, ranges, and other factors, depending on the application. For example, the time frames, rates, ratios, and ranges provided above are illustrative, but one of ordinary skill in the art would understand that these time frames and ranges may be varied or even be dynamic and variable, depending on the implementation.

As those skilled in the art will understand a number of variations may be made in the disclosed embodiments, all without departing from the scope of the invention, which is defined solely by the appended claims. It should be noted that although the features and elements are described in particular combinations, each feature or element can be used alone without other features and elements or in various combinations with or without other features and elements. The methods or flow charts provided may be implemented in a computer program, software, or firmware tangibly embodied in a computer-readable storage medium for execution by a general-purpose computer or processor.

Examples of computer-readable storage mediums include a read only memory (ROM), random-access memory (RAM), a register, cache memory, semiconductor memory devices, magnetic media such as internal hard disks and removable disks, magneto-optical media, and optical media such as CD-ROM disks.

Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, or any combination of thereof.

What is claimed is:

1. A method for per-title encoding comprising:
    receiving a video input comprising a plurality of video segments;
    spatially downscaling the video input to generate a first downscaled representation of the video input;
    temporally downscaling the first downscaled representation of the video input to generate a second downscaled representation of the video input;
    encoding the second downscaled representation of the video input to generate an encoded video, wherein the encoding is performed for a set of bitrates according to a beneficial spatial resolution and a beneficial framerate, the beneficial spatial resolution and the beneficial framerate corresponding to a convex hull;
    temporally upscaling the encoded video to generate a first upscaled encoded video; and
    spatially upscaling the first upscaled encoded video to generate a second upscaled encoded video.

2. The method of claim 1, wherein the spatially downscaling the video input comprises reducing the resolution of the video input such that the first downscaled representation of the video input has a lower resolution than the video input.

3. The method of claim 2, wherein reducing the resolution of the video input comprises reducing the resolution of each of the plurality of video segments.

4. The method of claim 1, wherein the temporally downscaling the first downscaled representation of the video input comprises reducing the number of frames in the first downscaled representation such that the second downscaled representation has fewer frames than the video input.

5. The method of claim 4, wherein reducing the number of frames in the first downscaled representation of the video input comprises reducing the number of frames of each of the plurality of video segments.

6. The method of claim 1, wherein the temporally upscaling the encoded video comprises duplicating frames.

7. The method of claim 1, wherein the temporally upscaling the encoded video comprises frame averaging.

8. The method of claim 1, wherein the temporally upscaling the encoded video comprises video interpolation.

9. The method of claim 1, wherein the temporally upscaling the encoded video comprises bicubic interpolation.

10. The method of claim 1, wherein the first upscaled encoded video has the same number of frames as the video input.

11. The method of claim 1, wherein the second upscaled encoded video has the same resolution as the video input.

12. The method of claim 1, further comprising calculating an objective metric using the second upscaled encoded video.

13. The method of claim 12, wherein the objective metric comprises a peak signal-to-noise ratio (PSNR).

14. The method of claim 12, wherein the objective metric comprises a video multimethod assessment fusion (VMAF).

15. The method of claim 1, wherein the encoding is performed according to an H.26x standard.

16. The method of claim 1, wherein the encoded video comprises an uncompressed encoding.

17. A system for per-title encoding comprising:
    a memory comprising non-transitory computer-readable storage medium configured to store a plurality of video segments and data associated with the plurality of video segments;
    one or more processors configured to execute instructions stored on the memory to:
        receive a video input comprising the plurality of video segments,
        spatially downscale the video input to generate a first downscaled representation of the video input,
        temporally downscale the first downscaled representation of the video input to generate a second downscaled representation of the video input,
        encode the second downscaled representation of the video input to generate an encoded video, wherein the encoding is performed for a set of bitrates according to a beneficial spatial resolution and a beneficial framerate, the beneficial spatial resolution and the beneficial framerate corresponding to a convex hull,
        temporally upscale the encoded video to generate a first upscaled encoded video, and
        spatially upscale the first upscaled encoded video to generate a second upscaled encoded video.

18. The system of claim 17, wherein the data associated with the plurality of video segments comprises a spatial resolution.

19. The system of claim 17, wherein the data associated with the plurality of video segments comprises a temporal resolution including a framerate.

20. The system of claim 17, wherein the data associated with the plurality of video segments comprises an objective metric.

* * * * *